US009319135B2

(12) United States Patent
Andersen et al.

(10) Patent No.: US 9,319,135 B2
(45) Date of Patent: Apr. 19, 2016

(54) LIGHT POWERED COMMUNICATION SYSTEMS AND METHODS OF USING THE SAME

(75) Inventors: James Kengo Andersen, Westlake Village, CA (US); Eric Lee Goldner, Chatsworth, CA (US); Jeffrey Carl Buchholz, Cross Plains, WI (US)

(73) Assignee: Avalon Sciences, Ltd. (GB)

( * ) Notice: Subject to any disclaimer, the term of this patent is extended or adjusted under 35 U.S.C. 154(b) by 90 days.

(21) Appl. No.: 13/981,162

(22) PCT Filed: Jan. 24, 2012

(86) PCT No.: PCT/US2012/022356
§ 371 (c)(1),
(2), (4) Date: Nov. 20, 2013

(87) PCT Pub. No.: WO2012/103085
PCT Pub. Date: Aug. 2, 2012

(65) Prior Publication Data
US 2014/0105609 A1 Apr. 17, 2014

Related U.S. Application Data

(60) Provisional application No. 61/435,881, filed on Jan. 25, 2011.

(51) Int. Cl.
*H04B 1/38* (2015.01)
*H04B 10/10* (2006.01)
(Continued)

(52) U.S. Cl.
CPC ........ *H04B 10/2503* (2013.01); *H04B 10/1143* (2013.01)

(58) Field of Classification Search
CPC .......... H04B 10/2503; H04B 10/1143; H04B 1/3838
USPC .................................. 398/132, 139
See application file for complete search history.

(56) References Cited

U.S. PATENT DOCUMENTS

| 4,155,005 | A | 5/1979 | Knowlton et al. |
| 4,255,015 | A | 3/1981 | Adams et al. |

(Continued)

FOREIGN PATENT DOCUMENTS

| CN | 2643296 | 9/2004 |
| CN | 101199413 | 6/2008 |

(Continued)

OTHER PUBLICATIONS

International Search Report for International Application No. PCT/US2010/025248 issued by the Korean Intellectual Property Office on Oct. 11, 2011.

(Continued)

*Primary Examiner* — Oommen Jacob
(74) *Attorney, Agent, or Firm* — Locke Lord LLP

(57) ABSTRACT

A light powered communications system. The light powered communications system includes an audio control center having at least one optical source and at least one optical receiver. The light powered communications system also includes a plurality of optically powered remote communication systems located remote from the audio control center, each of the optically powered remote communication systems being configured to receive an optical signal from the audio control center. The light powered communication system also includes at least one length of fiber optic cable between the audio control center and each of the optically powered remote communication systems.

21 Claims, 12 Drawing Sheets

(51) Int. Cl.
*H04M 1/00* (2006.01)
*H04B 10/25* (2013.01)
*H04B 10/114* (2013.01)

(56) References Cited

U.S. PATENT DOCUMENTS

| | | | |
|---|---|---|---|
| 4,292,628 A | 9/1981 | Sadler | |
| 4,799,752 A * | 1/1989 | Carome | 385/12 |
| 4,800,267 A | 1/1989 | Freal et al. | |
| 4,826,322 A | 5/1989 | Philips | |
| 4,879,755 A | 11/1989 | Stolarczyk et al. | |
| 4,893,930 A | 1/1990 | Garrett et al. | |
| 4,994,668 A | 2/1991 | Lagakos et al. | |
| 5,011,262 A | 4/1991 | Layton | |
| 5,051,799 A | 9/1991 | Paul et al. | |
| 5,172,117 A | 12/1992 | Mills et al. | |
| 5,227,857 A | 7/1993 | Kersey | |
| 5,367,376 A | 11/1994 | Lagakos et al. | |
| 5,397,891 A | 3/1995 | Udd et al. | |
| 5,493,390 A | 2/1996 | Varasi et al. | |
| 5,574,514 A * | 11/1996 | Tanihira et al. | 348/706 |
| 5,625,350 A * | 4/1997 | Fukatsu et al. | 340/4.41 |
| 5,680,489 A | 10/1997 | Kersey | |
| 5,712,932 A | 1/1998 | Alexander et al. | |
| 5,798,834 A | 8/1998 | Brooker | |
| 5,986,749 A | 11/1999 | Wu et al. | |
| 6,104,492 A | 8/2000 | Giles et al. | |
| 6,157,711 A | 12/2000 | Katz | |
| 6,281,976 B1 | 8/2001 | Taylor et al. | |
| 6,328,837 B1 | 12/2001 | Vohra et al. | |
| 6,381,048 B1 | 4/2002 | Chraplyvy et al. | |
| 6,453,022 B1 | 9/2002 | Weinman, Jr. | |
| 6,654,521 B2 | 11/2003 | Sheng et al. | |
| 6,819,812 B2 | 11/2004 | Kochergin et al. | |
| 6,891,621 B2 | 5/2005 | Berg et al. | |
| 6,900,726 B2 | 5/2005 | Graves | |
| 7,013,729 B2 | 3/2006 | Knudsen et al. | |
| 7,282,697 B2 | 10/2007 | Thomas et al. | |
| 7,683,312 B2 | 3/2010 | Goldner et al. | |
| 7,729,618 B2 * | 6/2010 | Tatum et al. | 398/139 |
| 7,840,105 B2 | 11/2010 | Goldner et al. | |
| 7,994,469 B2 | 8/2011 | Goldner et al. | |
| 7,999,946 B2 | 8/2011 | Andersen et al. | |
| 2002/0063866 A1 | 5/2002 | Kersey et al. | |
| 2002/0064331 A1 | 5/2002 | Davis et al. | |
| 2002/0064332 A1 | 5/2002 | Martin | |
| 2002/0086715 A1 * | 7/2002 | Sahagen | 455/568 |
| 2003/0094281 A1 | 5/2003 | Tubel | |
| 2003/0145654 A1 | 8/2003 | Knudsen et al. | |
| 2003/0147650 A1 * | 8/2003 | Hwang et al. | 398/107 |
| 2004/0046111 A1 | 3/2004 | Swierkowski | |
| 2004/0060697 A1 | 4/2004 | Tilton | |
| 2004/0246816 A1 | 12/2004 | Ogle | |
| 2005/0076713 A1 | 4/2005 | Knudsen | |
| 2005/0097955 A1 | 5/2005 | Berg et al. | |
| 2005/0111788 A1 | 5/2005 | Tsuyama | |
| 2006/0120675 A1 | 6/2006 | Goldner et al. | |
| 2007/0065149 A1 | 3/2007 | Stevens et al. | |
| 2008/0137589 A1 | 6/2008 | Barrett | |
| 2008/0249801 A1 * | 10/2008 | Zaleski | 705/2 |
| 2009/0101800 A1 | 4/2009 | Goldner et al. | |
| 2009/0123112 A1 * | 5/2009 | Kahana et al. | 385/13 |
| 2009/0140852 A1 | 6/2009 | Stolarczyk et al. | |
| 2009/0210168 A1 | 8/2009 | Vincelette | |
| 2010/0005860 A1 | 1/2010 | Coudray et al. | |
| 2010/0219334 A1 | 9/2010 | LeGrand | |
| 2011/0208963 A1 * | 8/2011 | Soffer | 713/168 |
| 2014/0105609 A1 | 4/2014 | Andersen et al. | 398/132 |
| 2015/0006538 A1 * | 1/2015 | Koike | 707/740 |

FOREIGN PATENT DOCUMENTS

| | | |
|---|---|---|
| JP | 2001-221684 | 8/2001 |
| JP | 2006-172339 | 6/2006 |
| JP | 2007-232515 | 9/2007 |
| KR | 10-1997-0002776 | 1/1997 |
| KR | 10-2002-0008457 | 1/2002 |
| WO | 99/05493 | 2/1999 |
| WO | 2011/050227 | 4/2011 |

OTHER PUBLICATIONS

International Search Report for International Application No. PCT/US2010/053659 issued by the Korean Intellectual Property Office on Aug. 2, 2011.

International Search Report for International Application No. PCT/US2010/053763 issued by the Korean Intellectual Property Office on Jul. 28, 2011.

International Search Report for International Application No. PCT/US2011/024465 issued by the Korean Intellectual Property Office on Oct. 27, 2011.

International Search Report for International Application No. PCT/US2011/025206 issued by the Korean Intellectual Property Office on Oct. 17, 2011.

International Search Report for International Application No. PCT/US2012/022356 issued by the Korean Intellectual Property Office on Sep. 3, 2012.

International Search Report for International Application No. PCT/US2012/028224 issued by the Korean Intellectual Property Office on Sep. 24, 2012.

International Search Report for International Application No. PCT/US2012/051338 issued by the Korean Intellectual Property Office on Mar. 14, 2013.

1st Office Action dated May 31, 2013 issued by the State Intellectual Property Office (SIPO) of the People's Republic of China for Chinese Patent Application No. 20180047796.6.

* cited by examiner

US 9,319,135 B2

LIGHT POWERED COMMUNICATION SYSTEMS AND METHODS OF USING THE SAME

RELATED APPLICATIONS

This application claims the benefit of priority to U.S. Provisional Patent Application Ser. No. 61/435,881, filed on Jan. 25, 2011, the content of which is incorporated in this application by reference.

TECHNICAL FIELD

This invention relates generally to the field of communication systems and, more particularly, to light powered communication systems and methods of using the same.

BACKGROUND OF THE INVENTION

Communication systems (e.g., telephone communication systems) are integral in many applications. For example, industrial and military applications rely on communication systems for efficiency and safety. Many currently used communication systems are conventional copper telephone systems with heavy cables and strong sensitivity to electrical interference. Further, typical conventional communication systems require electrical power at each location in the communication chain. In the event of a power failure the usefulness of such systems may be limited. Back-up power sources (e.g., battery systems, uninterruptible power supplies, etc.) are sometimes used; however, the cost of installation and maintenance of such back-up power sources at a plurality of locations may be cost-prohibitive.

Thus, a need exists for, and it would be desirable to provide, improved bi-directional communication systems.

BRIEF SUMMARY OF THE INVENTION

To meet this and other needs, and in view of its purposes, the present invention provides, according to an exemplary embodiment, a light powered communication system. The light powered communication system includes an audio control center having at least one optical source and at least one optical receiver. The light powered communication system also includes a plurality of optically powered remote communication systems (located remote from the audio control center), each of the optically powered remote communication systems being configured to receive an optical signal from the audio control center. The light powered communication system also includes at least one length of fiber optic cable between the audio control center and each of the optically powered remote communication systems.

According to another exemplary embodiment of the present invention, a method of operating a light powered communication system is provided. The method includes the steps of: (a) receiving an audio signal at one of a plurality of remote communication systems of the optically powered communication system; (b) transmitting an optical signal representative of the audio signal from the one of the plurality of remote communication systems to an audio control center of the optically powered communication system; (c) transmitting another optical signal representative of the audio signal to at least one other of the plurality of remote communication systems; and (d) converting the another optical signal to an audio output at the at least one other of the plurality of remote communication systems.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

According to the various exemplary embodiments of the present invention, a light powered communication system (e.g., a light powered phone system) is provided, wherein a number of users can communicate via a series of optical communication channels. The light powered communication system includes an audio control center and a plurality of remote communication systems. Bi-directional communications between the audio control center and the remote communication systems are optically powered; therefore, the communications may be completed without external electrical power at the remote communication systems. Each of the remote communication systems includes an optically driven listening device (e.g., an earpiece, a speaker, etc.) and a microphone (e.g., a fiber optic interferometer). The audio control center may serve several functions including: (a) providing light for, and demodulating signals from, each of the microphones (see, e.g., FIG. 2A); (b) retransmitting voice signals from a remote communication system to a desired user or users (see, e.g., FIGS. 3 and 7); (c) interpreting optical signals from at least one remote optical channel selector at each remote communication system that specifies whether each user (at a respective remote communication system) desires to communicate in a party line mode, or whether the user has selected other users (at specific remote communication systems) for communications (see, e.g., FIGS. 4-6); and (d) providing an annunciation at a remote communication system to alert a user of an incoming communication (see, e.g., FIG. 9).

Various exemplary functions and configurations of the present invention are shown in the figures. Although certain of the figures are described as distinct systems or subsystems, it should be understood that the teachings of the various figures may be combined in any way in a desired implementation.

Figure 1:
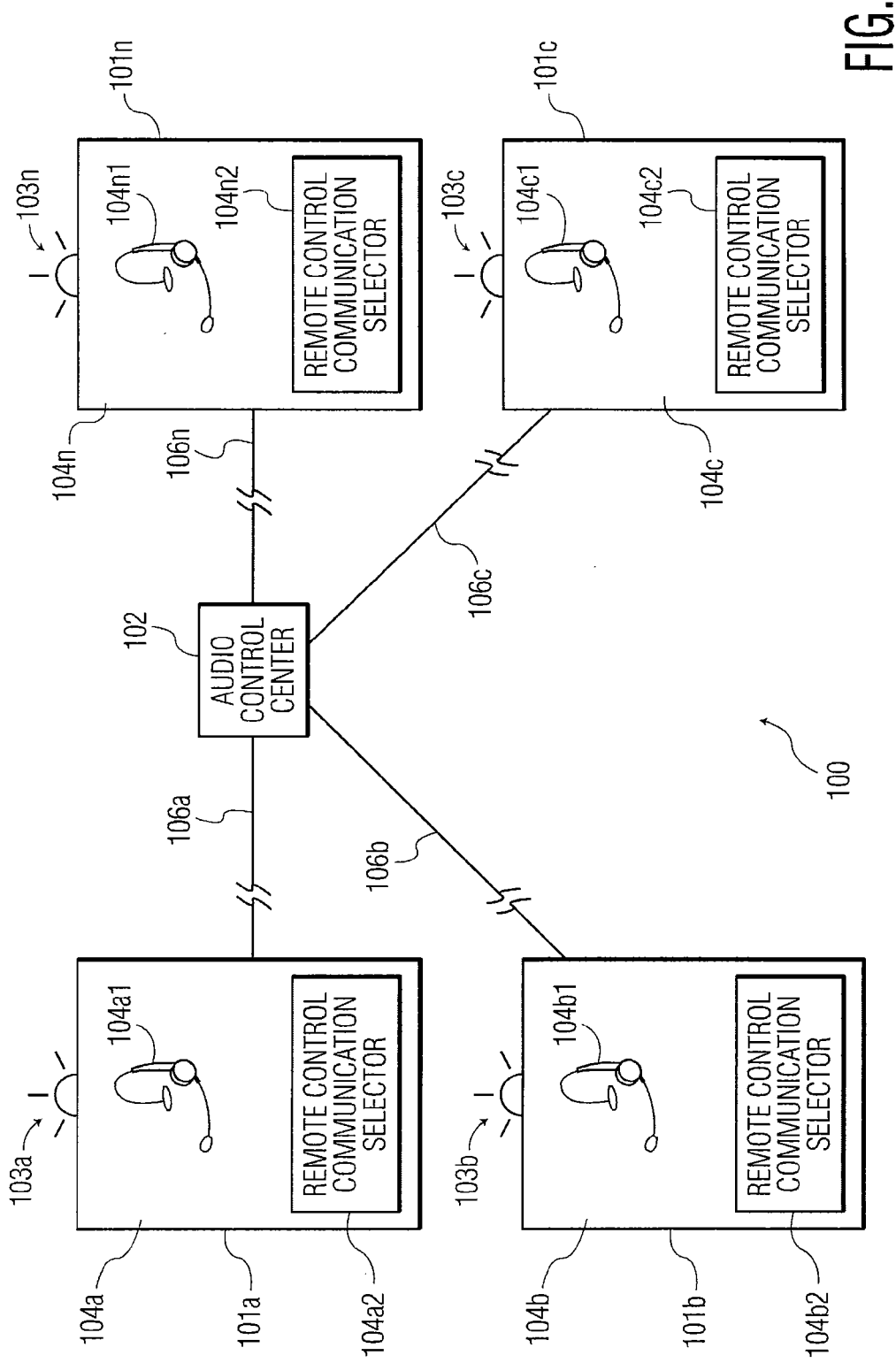
FIG. 1 is a block diagram of a light powered communication system in accordance with an exemplary embodiment of the present invention.

Referring now to the drawings, in which like reference numbers refer to like elements throughout the various figures that comprise the drawings, FIG. 1 illustrates a light powered communication system 100 (e.g., light powered phone system 100). System 100 includes an audio control center 102 and a plurality of remote communication systems 104a, 104b, 104c, . . . , and 104n. Each of remote communication systems 104a, 104b, 104c, . . . , and 104n is connected to audio control center 102 through a respective fiber optic cable 106a, 106b, 106c, . . . , and 106n (where each of the fiber optic cables includes one or more optical fibers). Each of remote communication systems 104a, 104b, 104c, . . . , and 104n includes optically powered elements connected to audio control center 102. In the illustrated embodiment, each remote communication system 104a, 104b, 104c, . . . , and 104n includes: a respective enclosure 101a, 101b, 101c, . . . , 101n; a respective annunciator 103a, 103b, 103c, . . . , 103n (e.g., a light such as an LED, an optical ringer, a buzzer, etc.); a respective optically powered headset 104a1, 104b1, 104c1, . . . , 104n1 (each including a respective microphone and earpiece); and a respective remote control communication selector 104a2, 104b2, 104c2, . . . , 104n2 (where each communication selector allows a user to determine which other user(s) with whom to communicate). The numerous remote communication systems 104a, 104b, 104c, . . . , and 104n may be distributed throughout a location (e.g., a manufacturing plant, a vessel/ship, a mine such as a coal or metal mine, etc.) remote from audio control center 102.

Figure 2A:
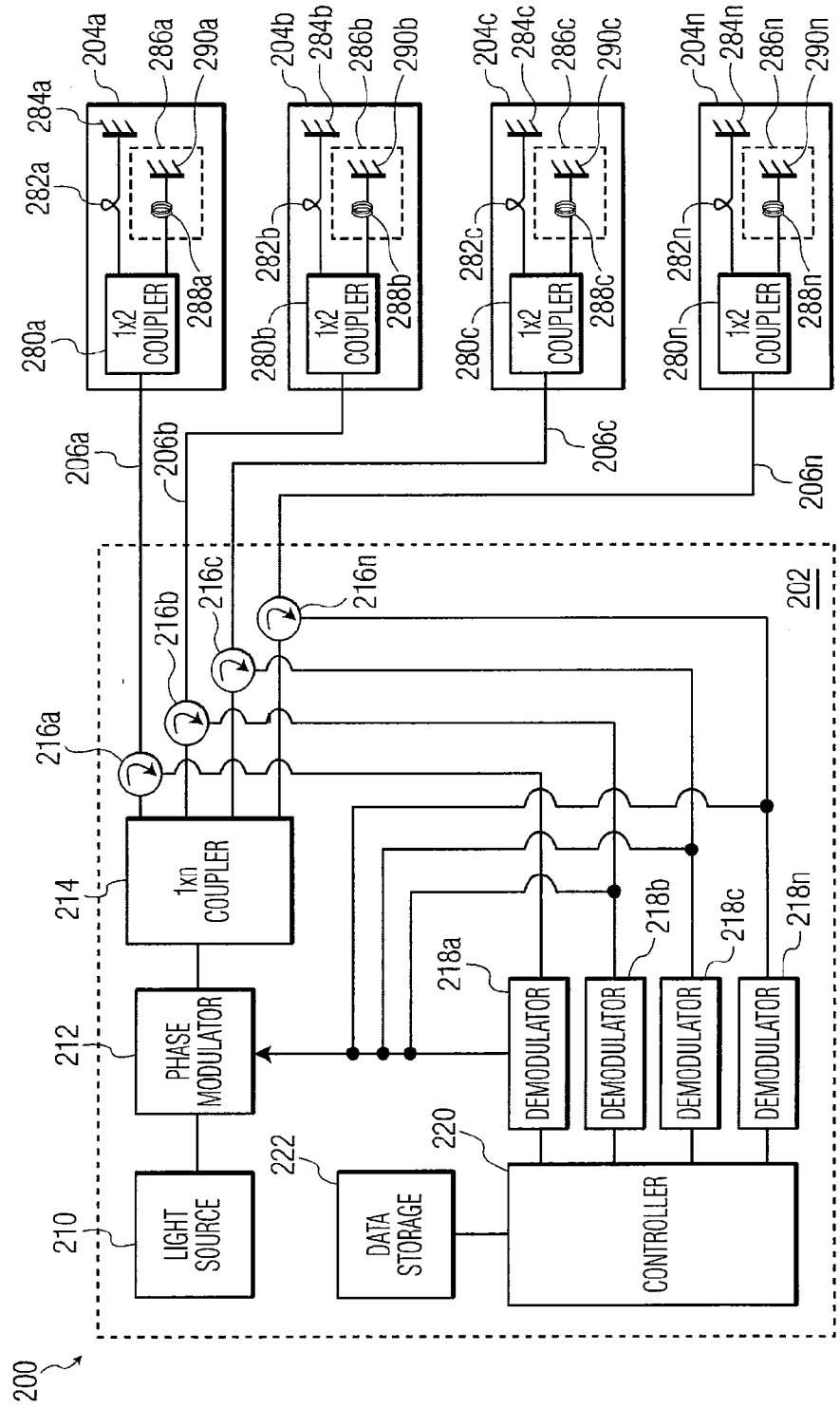
FIG. 2A is a block diagram illustrating elements of another light powered communication system in accordance with an exemplary embodiment of the present invention.
Figure 3:
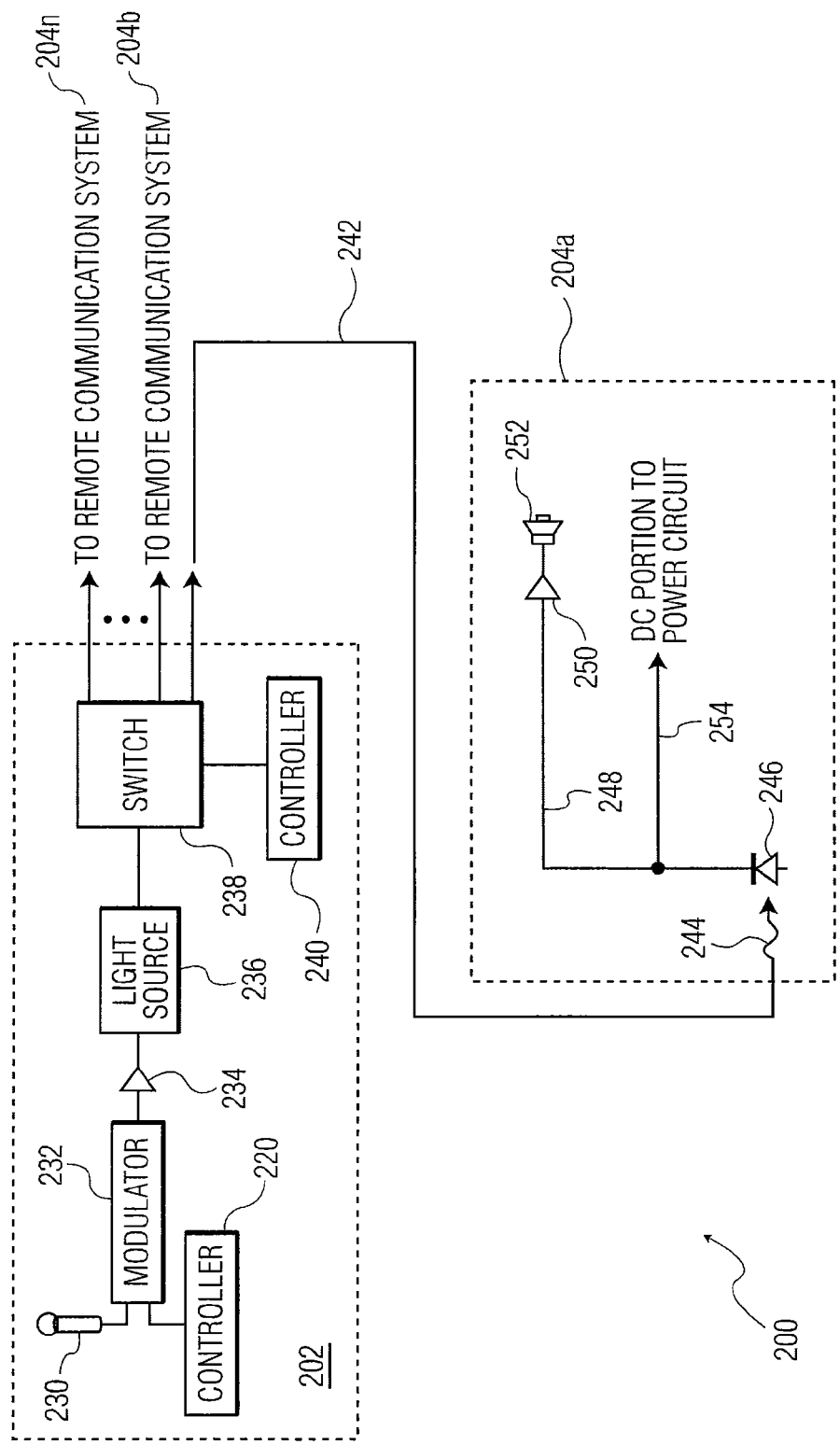
FIG. 3 is a block diagram illustrating additional elements of the light powered communication system of FIG. 2A.
Figure 4:
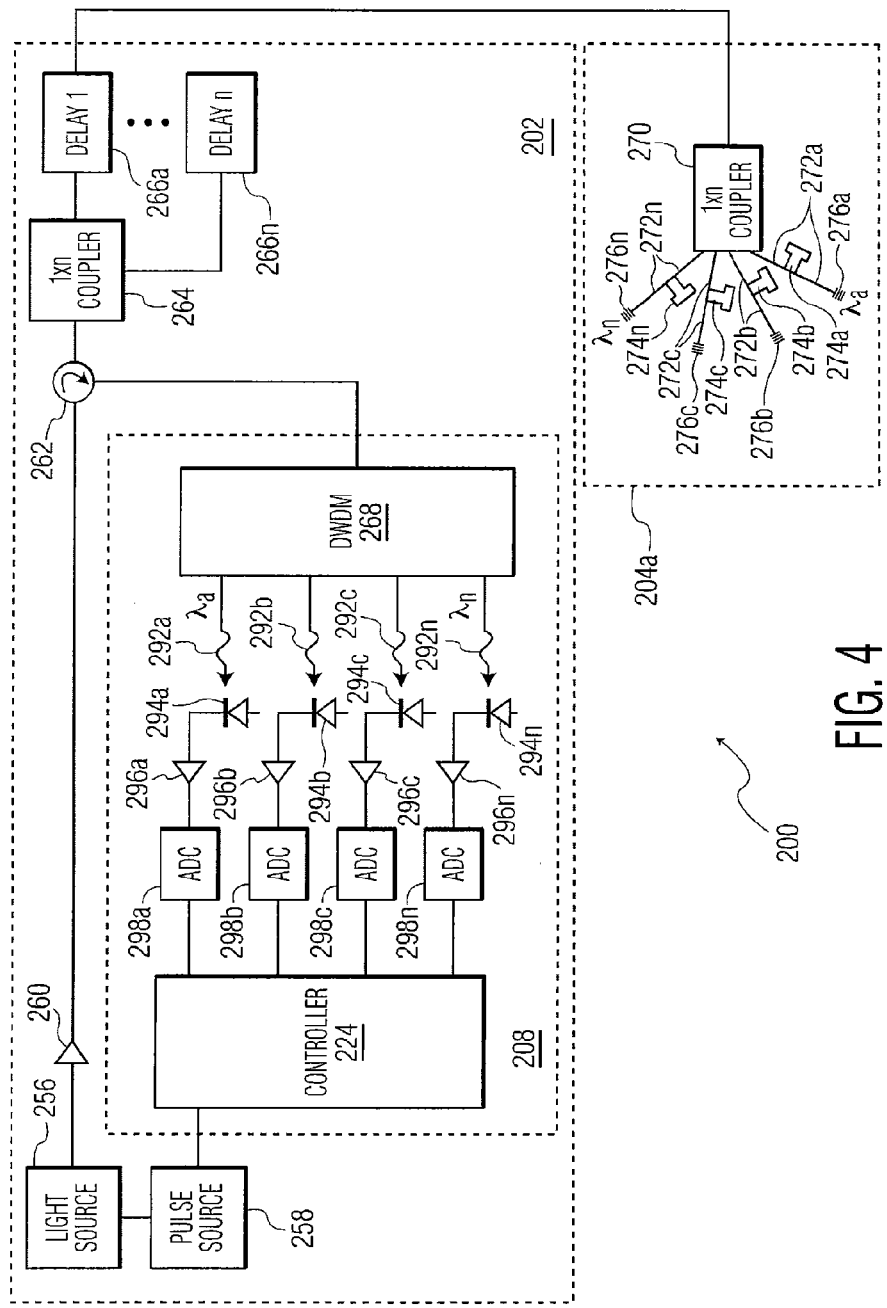
FIG. 4 is a block diagram illustrating additional elements of the light powered communication system of FIG. 2A.

Light powered communication/phone system 100 of FIG. 1 may have many different implementations, with varying elements and configurations. FIGS. 2A, 3, and 4 illustrate an exemplary light powered communication system 200. Light powered communication system 200 includes audio control center 202 (elements of which are shown in each of FIGS. 2A, 3, and 4) and a plurality of remote communication systems 204a, 204b, 204c, . . . , and 204n.

FIG. 2A illustrates a portion of light communication system 200 for processing "uplink" communications arriving at audio control center 202 from remote communication systems 204a, 204b, 204c, . . . , and 204n. A light source 210 (e.g., a laser, etc.) transmits light to a phase modulator 212 which provides a phase generated carrier signal (e.g., a phase carrier is imposed on a laser output from light source 210). The signal is then divided at an optical coupler 214, where portions of the divided signal are transmitted to respective remote communication systems 204a, 204b, 204c, . . . , and 204n via one or more optical fiber cables.

More specifically, a portion of the divided signal is transmitted from optical coupler 214 to an optical circulator 216a at audio control center 202. The signal leaves audio control center 202 along an optical fiber 206a, then reaches remote communication system 204a. Other portions of the divided signal from optical coupler 214 are transmitted through respective optical circulators 216b, 216c, and 216n and then along respective optical fibers 206b, 206c, and 206n, then reaching respective remote communication systems 204b, 204c, and 204n. According to an exemplary embodiment of the present invention, all or a portion of the elements of each remote communication system (e.g., system 204a) shown in FIG. 2A are included in an optical headset (such as headset 104a1 shown in FIG. 1) at a location remote from an audio control center.

Upon reaching the respective remote communication systems 204a, 204b, 204c, . . . , and 204n shown in FIG. 2A, the respective signals are split at respective optical couplers 280a, 280b, 280c, . . . , and 280n. Each split signal is divided between (1) a reference leg of an interferometer, and (2) a sensing leg of an interferometer within the respective remote communication system (e.g., where the sensing leg may include optical fiber captured within a thin flexible membrane, or wrapped around a thin-walled sealed tube, or other configurations). More specifically, one portion of the signal from coupler 280a is transmitted to a reference leg including acoustically insensitive coil of a fiber 282a (e.g., wherein the deadened coil may be potted or substantially fixed in position) and a reflector 284a. The other portion of the signal from coupler 280a is transmitted to a sensing leg including a microphone 286a. In the example shown in FIG. 2A, microphone 286a is a Michelson type interferometer including a coil of fiber 288a (in an acoustically sensitive arrangement) and a reflector 290a.

For example, a user of remote communication system 204a speaks into microphone 286a in an effort to communicate with another user or users of light powered communication system 200. Microphone 286a converts vibrations from a voice of the speaking user (i.e., an audio signal) to a change in the optical phase of the light passing through microphone 286a. While FIG. 2A illustrates microphone 286a included in a Michelson type interferometer, it is understood that other types of microphones (e.g., a linearized Sagnac type interferometer, or other configurations such as amplitude modulated acoustic transducers) are contemplated. Similarly, each of remote communication systems 204b, 204c, . . . , 204n includes: respective optical couplers 280b, 280c, . . . , 280n; respective reference legs including respective acoustically insensitive coils of fiber 282b, 282c, . . . , 282n and respective reflectors 284b, 284c, . . . , 284n; and respective microphones 286b (including coil of fiber 288b and reflector 290b), 286c (including coil of fiber 288c and reflector 290c), . . . , 286n (including coil of fiber 288n and reflector 290n).

After reflection, light from each reference leg and microphone 286a, 286b, 286c, . . . , 286n is recombined (i.e., light from the reference leg and sensing leg is coherently recombined to convert the phase change to an intensity change) at respective optical coupler 280a, 280b, 280c, . . . , 280n, and then passes through respective optical circulator 216a, 216b, 216c, . . . , 216n (within audio control center 202), and then on to a respective demodulator 218a, 218b, 218c, . . . , 218n.

Each demodulator 218a, 218b, 218c, ..., 218n (within audio control center 202) converts the light returning from a respective microphone (from a respective remote communication system) into an electrical signal, and then samples and demodulates (down converts) the electrical signal. Demodulators 218a, 218b, 218c, ..., 218n are connected to a controller 220 (e.g., a microcontroller, a programmable logic controller, a digital signal processor, etc.), where controller 220 is used to filter, post process, and re-transmit the demodulated signals from demodulators 218a, 218b, 218c, ..., 218n (the "downlink" communications).

Each demodulator 218a, 218b, 218c, ..., 218n is also used to send light (i.e., downlink communications) to certain remote communication systems, as selected by a user at the respective remote communication system using a remote control communication selector (also referred to as a remote optical channel selector), as described below. This signal retransmission (by way of controller 220) is to select remote communication systems 204a, 204b, 204c, ..., 204n (as selected by users at systems 204a, 204b, 204c, ..., 204n or as selected at the audio control center 202, as described below). Controller 220 is also connected to a data storage 222 which may be used for logging communications (e.g., regular communications, communications during drills or an emergency, etc.). Data storage 222 may be considered akin to a black box (e.g., a voice/data recorder) of an aircraft (e.g., recording all communication activity for later playback and analyses).

Variations to the uplink implementation illustrated in FIG. 2A are contemplated. In one example variation, multiple microphones may be multiplexed on a single cable fiber by combining laser wavelengths prior to phase modulation by use of a wavelength division multiplexer. For example, the wavelengths may be separated for each microphone by use of an optical add/drop multiplexer (which also can be used to recombine the wavelengths for transit back to the audio control center). Upon returning to the demodulator, the multiple wavelength light may be split into individual wavelengths (one for each demodulator) by use of a wavelength division multiplexer. Of course, other variations are contemplated.

Figure 2B:
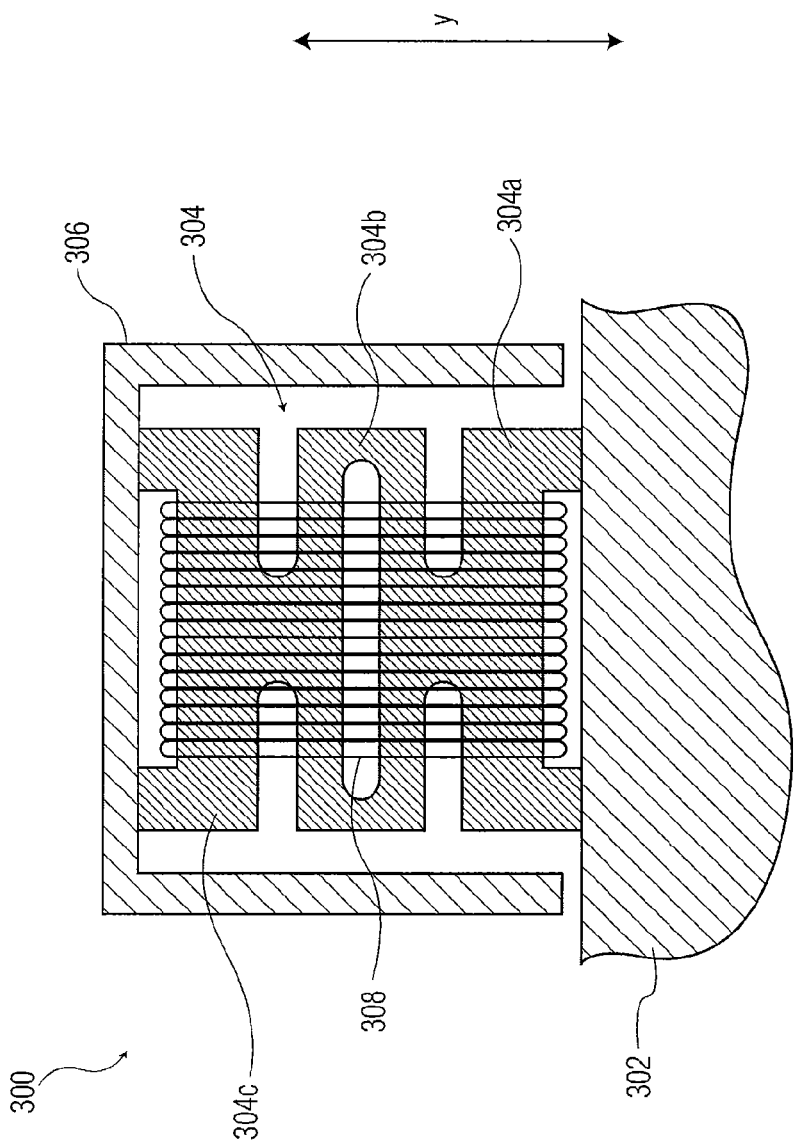
FIG. 2B is a block diagram of a transducer which may be used in connection with a microphone of a light powered communication system in accordance with an exemplary embodiment of the present invention.

As provided above, microphones 286a, 286b, 286c, ..., 286n include a coil of optical fiber (e.g., in an acoustically sensitive arrangement) to pick up speech by a user of the relevant remote communication system (such as in a Michelson or linear Sagnac type interferometer). It may be desired to include a transducer in the microphone along with the coil of optical fiber. FIG. 2B is a cross-sectional view of an exemplary transducer 300. Transducer 300 includes a fixed mandrel 304a, a spring 304b, and a moveable mandrel 304c (which tends to move along the y-axis shown in FIG. 2B) each formed from a unitary piece of material 304. A mass 306 (which may envelope or surround at least a portion of fixed mandrel 304a, spring 304b, and/or moveable mandrel 304c) is secured to moveable mandrel 304c. Fixed mandrel 304a is rigidly attached to a body of interest 302 within a remote communication system (e.g., system 204a). A length of optical fiber 308 is wound around fixed mandrel 304a and moveable mandrel 304c. Optical fiber 308 is optically connected to (or continuous with) the length of optical fiber between the relevant optical coupler (e.g., coupler 280a) and the relevant reflector (e.g., reflector 290a). By including transducer 300 in the microphone (e.g., microphone 286a), the optical fiber (including the portion wound around fixed mandrel 304a and moveable mandrel 304c) has improved sensitivity. Of course, alternative types of transducers may be utilized within the scope of the present invention.

FIG. 3 is a block diagram of additional portions of light powered communication system 200, and illustrates "downlink" communications from audio control center 202 to a remote communication system or systems (i.e., retransmission of uplink communications received at audio control center 202 described above). Electrical signals from either a microphone 230 (e.g., an electrical microphone for a user local to audio control center 202), or from controller 220 (i.e., from one of the uplink communications received by one of microphones 286a, 286b, 286c, ..., 286n), are modulated (e.g., such as through pulse width modulation, PWM) at a modulator 232 and are thereafter imposed on an injection current input 234 of a light source 236 (e.g., a laser 236). The signal from light source 236 is transmitted through an optical switch 238 (where a controller 240 operates switch 238, thus determining along which optical fibers the voice modulated output from light source 236 is provided) and along a fiber optic cable from audio control center 202 to one or more remote communications systems 204a, 204b, 204c, ..., 204n (e.g., to a headset at a given remote communication system or systems).

Specifically, FIG. 3 illustrates a modulated output signal transmitted through switch 238 to remote communication system 204a. The light 244 received at remote communication system 204a travels along a path 242 and is converted to an electric current via a photodetector 246. This electric current is divided into an AC signal portion 248 and DC signal portion 254. AC signal portion 248 is amplified at an amplifier 250 and is then provided as an audio output to a listening device 252 (e.g., ear phone 252, speaker 252, etc.). DC signal portion 254 is used to provide bias voltage(s) to the power circuit of amplifier 250. A time division multiplexing or wavelength division multiplexed scheme may be employed for handling multiple simultaneous conversations.

While FIG. 3 illustrates the electrical current being divided into an AC signal portion and a DC signal portion, in another exemplary embodiment it is understood that the electrical current output from photodetector 246 may be transmitted to feed listening device 252 directly without being divided into the AC signal portion and a DC signal portion.

As will be appreciated by those skilled in the art, users of remote communication systems 204a, 240b, 204c, ..., 204n may have the opportunity to speak with various other users of the light communication system (e.g., in a party line mode where all uplink communications are heard at all remote communication systems simultaneously), or may select one or more users to speak with individually (e.g., where an optical switch is operated at the audio control center based on the selected users). If the user selects an individual user to speak with, there are various types of configurations which may be used to select that user. FIG. 4 is one such exemplary configuration of a remote communications channel selector using an interrogation system, and illustrates additional elements of light powered communication system 200.

FIG. 4 is a time-division multiplexing (TDM) implementation; however, a wavelength-division multiplexing (WDM) implementation is an exemplary alternative implementation. An electrical pulse source 258 provides voltage to drive a light source 256 (e.g., broadband light source 256 such as a SLED), and the light may be amplified at an amplifier 260. Following amplifier 260 the light passes through an optical circulator 262, and is divided at an optical coupler 264. More specifically, differing delays (e.g., one of delays 266a through 266n, where such delay may be applied through coils of optical fiber of different lengths) are applied to the divided light output from optical coupler 264 (i.e., a different delay is applied to each line going to a respective channel selector at a respective remote communication system) (i.e., a TDM operation). In the exemplary embodiment illustrated in FIG.

4, following delay 266a, light received at remote communication system 204a is directed through an optical coupler 270 which divides the light. The divided light is directed to one of a plurality of optical paths 272a, 272b, 272c, . . . , 272n, where each optical path includes a respective switch 274a, 274b, 274c, . . . , 274n, and a respective FBG (fiber Bragg grating) 276a, 276b, 276c, . . . , 276n where each FBG corresponds to a different light wavelength $\lambda_a$-$\lambda_n$.

For example, switches 274a, 274b, 274c, . . . , 274n may each be a button connected to an optical shutter that allows light to transmit to the respective FBG. The light then reflects back through optical coupler 270 and optical coupler 264, to dense wavelength division multiplexer 268 (DWDM) at an interrogator 208 at audio control center 202. In such an example, a user at a given remote communication system (e.g., system 204a) may actuate the respective switches 274a, 274b, 274c, . . . , 274n in order to communicate with the desired listener(s) at locations associated with the actuated switches (e.g., where each switch corresponds to a given remote communication system). That is, DWDM 268 at interrogator 208 separates the returned light from the various remote communication systems into different wavelengths (i.e., $\lambda_a$-$\lambda_n$) each imposed upon a different optical photodetector 294a, 294b, 294c, . . . , 294n. More specifically, because each pulse of light transmitted from audio control center 202 has a unique and predefined delay, each return pulse (with a spectrum that defines the listeners as selected by a user at a given remote communication system through operation of switches 274a, 274b, 274c, . . . , 274n) arrives at interrogator 208 at a different time, but in a deterministic order such that interrogator 208 can determine which user (at a given remote communication system) has selected which set of listeners. As shown in FIG. 4, light signals 292a, 292b, 292c, . . . , 292n (at wavelengths $\lambda_a$-$\lambda_n$) are converted to respective electric current signals via photodetectors 294a, 294b, 294c, . . . , 294n, where the electric current signals are amplified at amplifiers 296a, 296b, 296c, . . . , 296n, and converted to digital signals via analog-to-digital converters (ADCs) 298a, 298b, 298c, . . . , 298n on their way to a controller 224.

Figure 5:
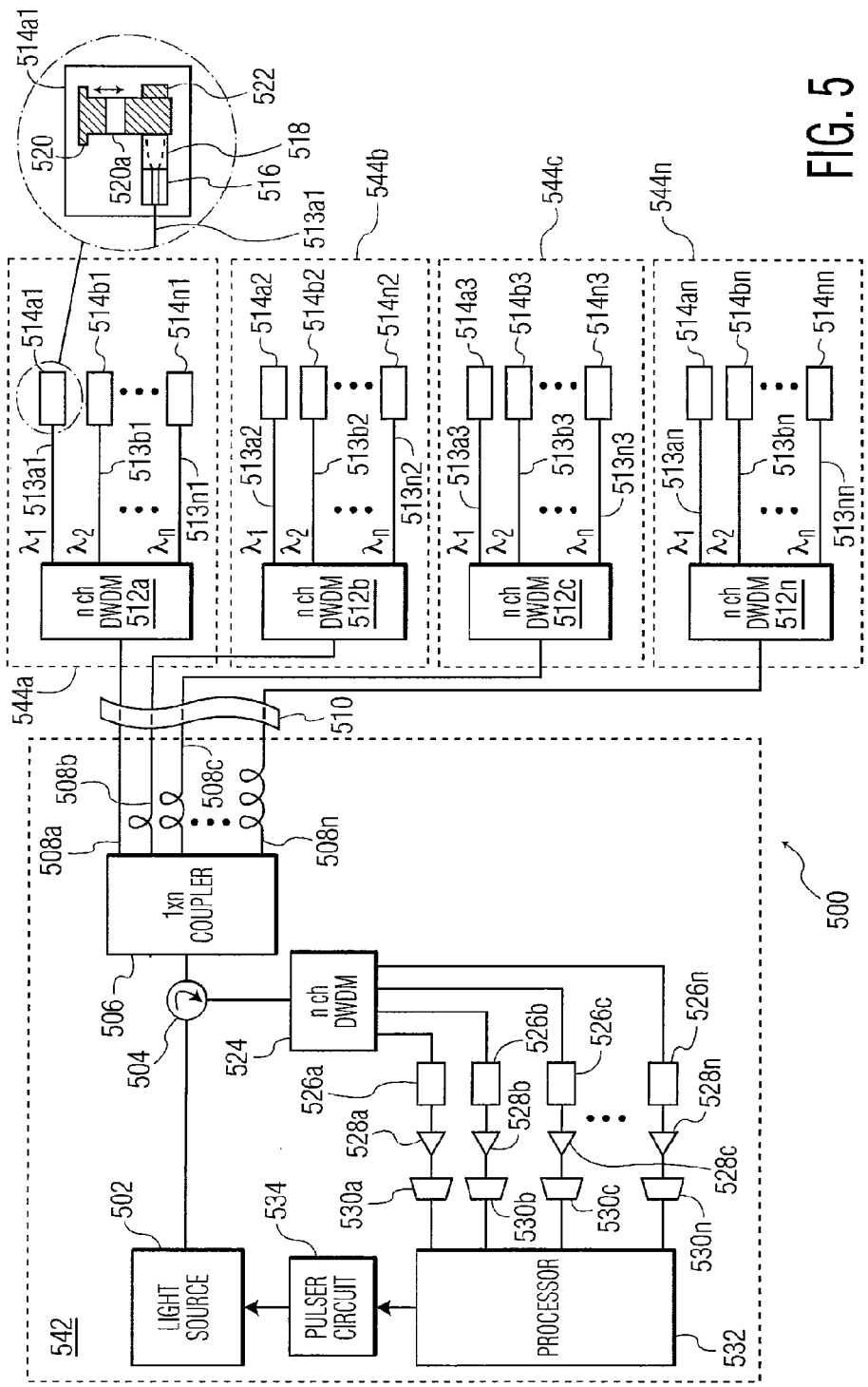
FIG. 5 is a block diagram illustrating elements of yet another light powered communication system in accordance with an exemplary embodiment of the present invention.
Figure 6:
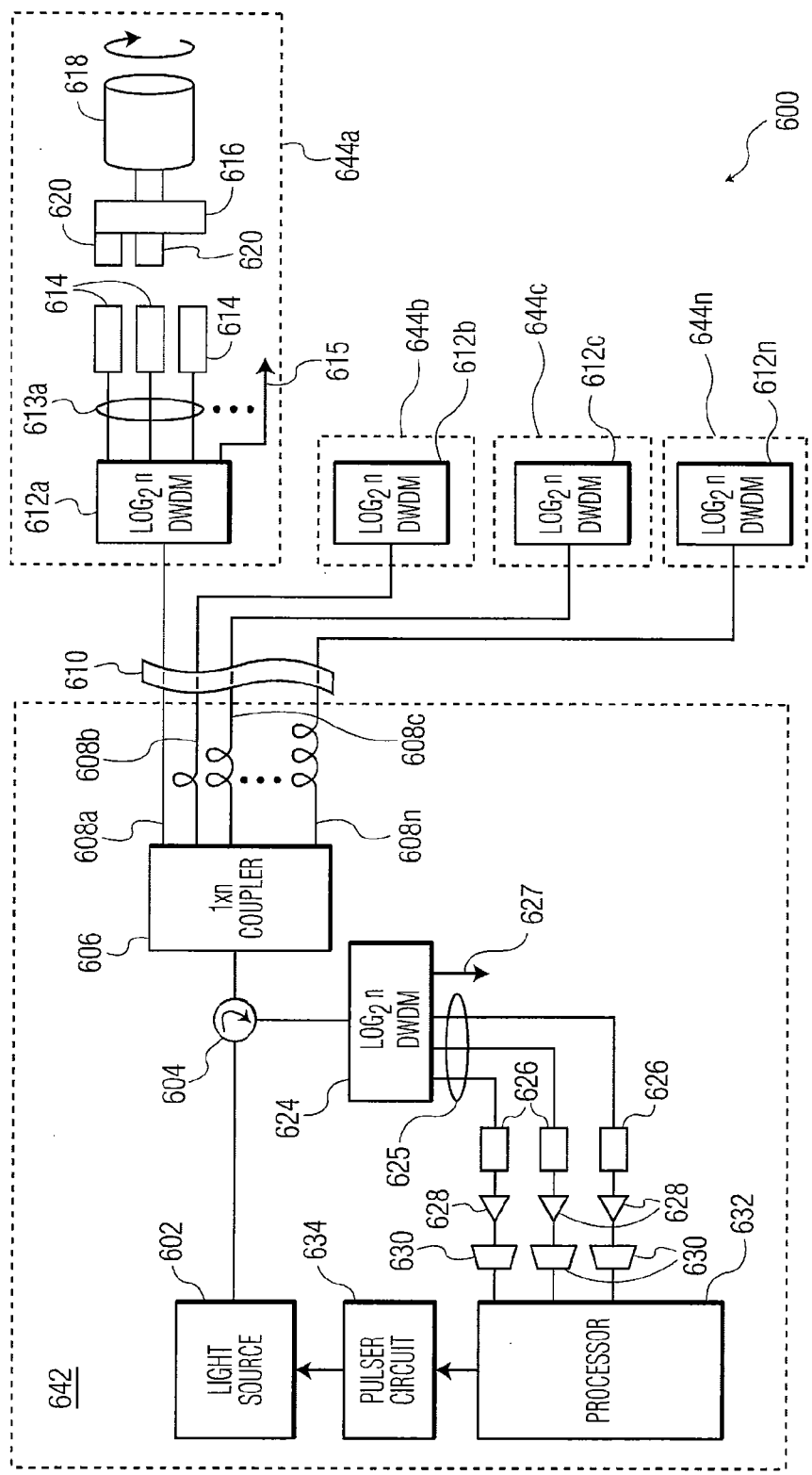
FIG. 6 is a block diagram illustrating elements of yet another light powered communication system in accordance with an exemplary embodiment of the present invention.

FIGS. 5 and 6 provide additional exemplary configurations for remote communication channel selectors. FIG. 5 illustrates a portion of a light powered communication system 500 including certain elements at an audio control center 542 and at a plurality of remote communication systems 544a, 544b, 544c, . . . , 544n. An electrical pulser circuit 534 provides voltage to a light source 502 (e.g., a broadband light source such as a superluminescent light emitting diode, SLED). Light from light source 502 passes through an optical circulator 504, and is divided at an optical coupler 506. Light from optical coupler 506 is sent in short pulses (along optical fibers 508a, 508b, 508c, . . . , 508n) to a series of users at a plurality of remote communication systems. Optical fibers 508a, 508b, 508c, . . . , 508n include unique, fixed optical delays (e.g., generating total delays on the order of a few meters) that are applied to the pulsed optical outputs from audio control center 542.

Optical fibers in a cable 510 carry the optical pulses (e.g., broadband pulses) to each user at the various remote communication systems. At each remote communication system 544a, 544b, 544c, . . . , 544n, a respective Dense Wavelength Division Multiplexer (DWDM) 512a, 512b, 512c, . . . , 512n is used to separate the light spectrum into n bands (at wavelengths $\lambda_1$ to $\lambda_n$), each band corresponding to one of the n users (e.g., n remote communication systems). Light at each of the wavelengths travels along a respective optical path 513a1, 513b1, . . . , 513n1 to respective optical selectors 514a1, 514b1, . . . , 514n1 (or along optical paths 513a2, 513b2, . . . , 513n2 to respective optical selectors 514a2, 514b2, . . . , 514$_n$2 in system 544b) (or optical paths 513a3, 513b3, . . . , 513n3 to respective optical selectors 514a3, 514b3, . . . , 514n3 in system 544c) (or optical paths 513an, 513bn, . . . , 513nn to respective optical selectors 514an, 514bn, . . . , 514nn in system 544n).

The detailed view of optical selector 514a1 illustrates light entering a ferrule 516 via optical path/fiber 513a1, where the light is collimated via a collimating lens 518 (e.g., graded index lens 518). If a push button 520 is in the position shown in FIG. 5, the light is blocked and cannot reach a reflector 522 (and consequently no light for such a wavelength/color will be returned to audio control center 542). In such a case, the user at remote control system 544a has not selected the remote control system associated with wavelength $\lambda_1$ as one of the recipients of a message/communication. If push button 520 is depressed, the collimated light passes through a hole 520a, reaches reflector 522, and reflects back such that light for such a wavelength/color will be returned to audio control center 542. In such a case, the user at remote communication system 544a has selected the remote communication system associated with a given wavelength as one of the recipients of a message/communication. Thus, the user at a given remote communication system (e.g., system 544a) selects the remote communication systems with whom the user wishes to communicate (e.g., by depressing the buttons 520 associated with the desired remote communication systems).

The light associated with the desired remote communication systems is recombined at DWDMs 512a, 512b, 512c, . . . , 512n, and is transmitted back to audio control center 542 along optical fibers 508a, 508b, 508c, . . . , 508n, and is then recombined with other signals at optical coupler 506, passes through optical circulator 504, and reaches DWDM 524. DWDM 524 divides the incoming light into wavelength bands, where each wavelength band is directed to a different one of the optical receivers 526a, 526b, 526c, . . . , 526n. The timing of the generated optical pulses is known, and the delay associated with each remote communication system is also known. Thus, audio control center 542 recognizes a channel selection as being received from a specific remote communication system. The output from optical receivers 526a, 526b, 526c, . . . , 526n is amplified by a respective one of the amplifiers 528a, 528b, 528c, . . . , 528n, and is digitized by a respective one of the analog-to-digital converters (ADCs) 530a, 530b, 530c, . . . , 530n. Output signals from ADCs 530a, 530b, 530c, . . . , 530n are input to a processor 532 to determine which users (i.e., remote communication systems) have been selected to receive a given communication, and, accordingly, which switch condition or (downlink) light source (e.g., laser) is to be pulse width modulated for retransmission.

FIG. 6 illustrates a portion of a light powered communication system 600. Except as described below, many of the elements shown in FIG. 6 are the same as elements of FIG. 5 where such elements have the same reference numeral except that the first digit in FIG. 6 is a "6" instead of a "5" as in FIG. 5. Otherwise, the elements (and their description with respect to FIG. 5) are the same and a separate description is not repeated here. A primary difference between FIGS. 5 and 6 is that in FIG. 5 there is a unique wavelength of light (e.g., $\lambda_1$, $\lambda_2$, . . . , $\lambda_n$) for each remote communication system from DWDM 512a. Likewise, in FIG. 5, there is a unique wavelength of light input to (and output from) DWDM 524 for each remote communication system. However, it may be desirable to reduce the physical hardware in system 500, such as the hardware in each remote communication system 544a, 544b, 544c, . . . , 544n.

In FIG. 6, the number of outputs from DWDM 612 to collimating lenses 614 is reduced as compared to FIG. 5 because of the structure (described below). Therefore, an n channel DWDM is not used as in FIG. 5. Rather, a $\log_2 n$ DWDM 612a (where n is the number of remote communication systems) is utilized. As such, for an exemplary eight outputs from (or return signals to) DWDM 612a only three optical fibers are used (as shown in group 613a of three optical fibers, where additional optical fibers are represented by arrow 615). More specifically, by using a binary code approach to reduce hardware, in order to select between eight potential receivers of a given communication (e.g., at eight different remote communication systems), eight optical fibers (and eight corresponding wavelengths) are not required at the channel selector (i.e., three fibers, $2^3$, may be used). Light received at remote communications system 644a (from cable 610) is divided into a series of wavelength bands by DWDM 612a. Each of the output fibers from DWDM 612a is connected to a respective collimating lens 614. Each output from a collimating lens 614 transmits to a control knob 618 which is connected to a cassette 616 (which contains one or more highly reflective mirrors 620).

As knob 618 is rotated to one of a series of predetermined positions, one or more mirrors 620 reflects light back into one or more of collimating lenses 614 in accordance with a predetermined code (e.g., a binary number). Light of different wavelength bands that is reflected back into the one or more collimating lenses 614 is recombined at DWDM 612a, and transmitted back along fiber 608a, through optical coupler 606, and directed through optical circulator 604 to a circulator output fiber leading back to DWDM 624. At DWDM 624, the light is again split into the same bands as by DWDM 612a. Outputs of DWDM 624 are connected to individual detectors at optical receivers 626 (where a group 625 of three optical fibers provide an outputs from DWDM 624, and where additional optical fibers are represented by arrow 627). After amplification (at amplifiers 628) and digitizing (at ADCs 630), the signal presence is determined by processor 632. The resulting wavelength "code" received by processor 632 is coordinated with a predetermined code for each of the remote communications systems.

The detailed operation of each additional remote communication system 644b, 644c, . . . , 644n is omitted for simplicity; however, it is understood that their operation and structure is similar to that described above for system 644a. With regard to the multiple remote communications systems 644a, 644b, 644c, . . . , 644n, pulser circuit 634 provides a train of very short pulses to drive light source 602 (e.g., a broadband optical source). Separate and different fiber delay lines within fibers 608a through 608n are provided to ensure that, in addition to physical offsets between the various remote communications systems, a fixed and sufficiently long time delay is incorporated so that processor 632 can interpret a series of broadband pulses, each from a different remote communication system, and each having a different optical spectral band.

The present invention is not limited to the remote channel selector structures and functions described above in connection with FIGS. 4-6. That is, additional configurations are contemplated. In one further example, as opposed to a hardware selector, voice recognition software in a controller may be used to recognize voice commands provided by a user (e.g., through a headset at a remote communication system) in order to determine which remote communication system(s) should receive communications. In such a case, the controller (e.g., processor 532) may interpret the selected user by using a voice recognition algorithm.

Figure 7:
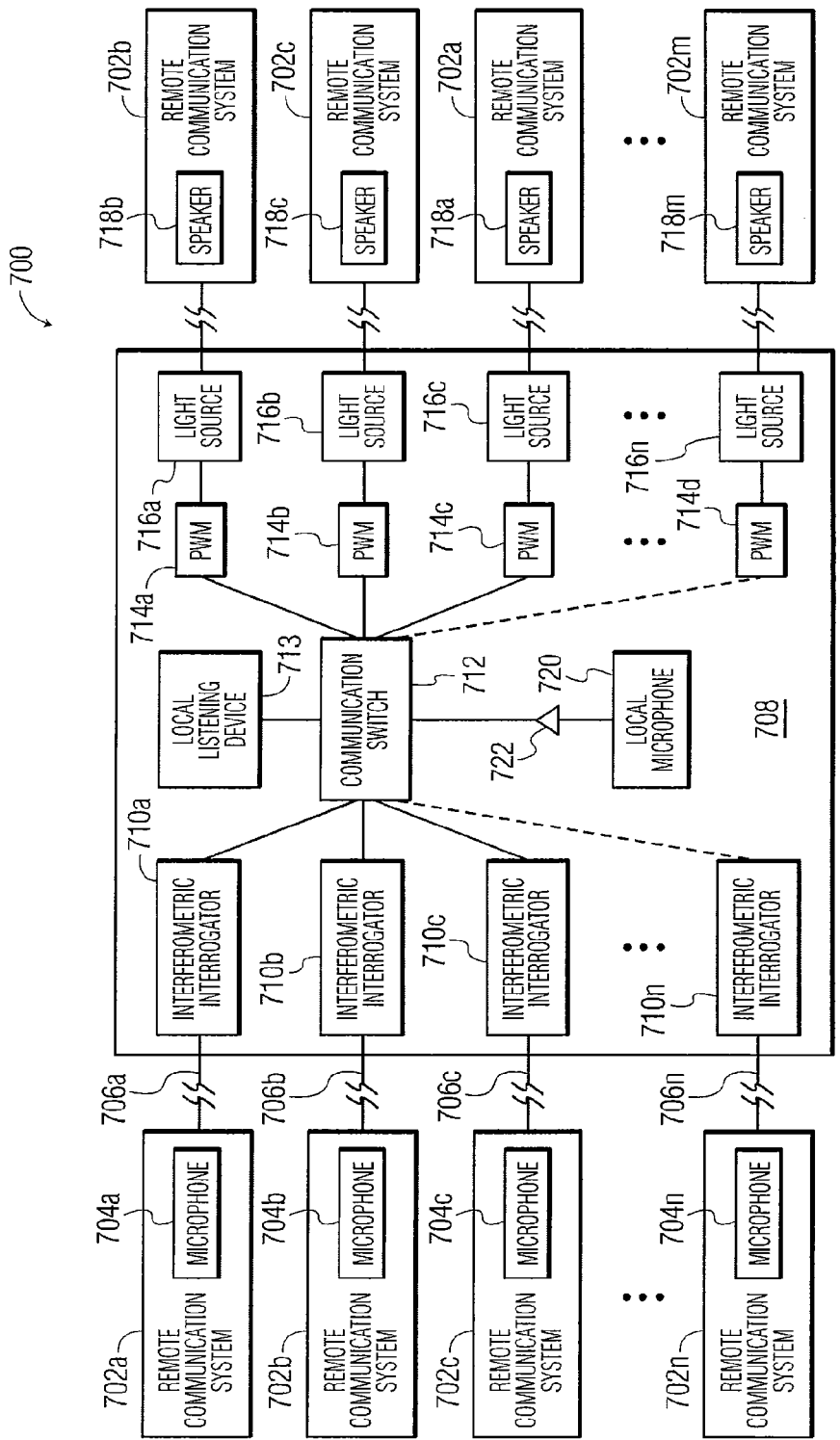
FIG. 7 is a block diagram illustrating elements of yet another light powered communication system in accordance with an exemplary embodiment of the present invention.

FIG. 7 is a block diagram illustrating how multiple users communicate in accordance with a light powered communication system 700. System 700 includes an audio control center 708 and a plurality of remote communication systems 702a, 702b, 702c, . . . , 702n. System 700 includes a communication switch 712 which routes messages from a sender of a message (e.g., a sender at a remote communication system, a sender at the audio control center, etc.) to a desired recipient or recipients (e.g., a recipient at a remote communication system). As shown on the left side of FIG. 7, each remote communication system 702a, 702b, 702c, . . . , 702n includes a respective optical microphone 704a, 704b, 704c, . . . , 704n. For example, each of the optical microphones may be integrated in a headset at a remote communication system (e.g., such as headset 104a1 shown in FIG. 1), and each optical microphone may include a coil of optical fiber in an acoustically sensitive arrangement as described above (e.g., in a Michelson interferometer arrangement, in a linear Sagnac interferometer arrangement, etc.). Audio signals sensed at microphones 704a, 704b, 704c, . . . , 704n are transmitted to a respective interferometric interrogator 710a, 710b, 710c, . . . , 710n along a respective optical fiber 706a, 706b, 706c, . . . , 706n. Interrogators 710a, 710b, 710c, . . . , 710n may each include a light source (e.g., a laser) and a modulator (e.g., light source 210 and phase modulator 212 as shown in FIG. 2A). Of course, while a distinct interrogator 710a, 710b, 710c, . . . , 710n is shown in FIG. 7 for interrogating a corresponding microphone 704a, 704b, 704c, . . . , 704n, it is understood that one interrogator may be used to interrogate a plurality of microphones at multiple remote communication systems (e.g., as shown in FIG. 2A).

The communications received at each interrogator 710a, 710b, 710c, . . . , 710n are transmitted to optical communication switch 712 for routing (i.e., retransmission) to desired remote communication systems. Such a communication may be heard locally, if desired, at audio control center 708 using a local listening device 713 (e.g., earpiece 713, speaker 713, etc.). Also, a user at audio control center 708 may commence a communication locally (as opposed to being received by one of the interrogators) using a local microphone 720, where such communication is amplified at an amplifier 722 and received at communication switch 712. The communications received at communication switch 712 (whether received from a remote communication system, or whether initiated locally at microphone 720) are directed to one or more of the pulse width modulators (PWMs) 714a, 714b, 714c, . . . , 714n (e.g., such as modulator 232 shown in FIG. 3) where the modulated electrical signal is imposed on the signal from a respective one of a light source 716a, 716b, 716c, . . . , 716n (e.g., such as light source 236 in FIG. 3). The signals then leave audio control center 708 along a respective optical fiber to a respective remote communication system.

As shown in FIG. 7, each remote communication system (e.g., 702a, 702b, 702c, 702n, etc.) includes a corresponding speaker (e.g., 718a, 718b, 718c, 718m, etc.) (e.g., an earpiece such as an earpiece of a headset such as headset 104a1 shown in FIG. 1, a stand-alone speaker at the remote communication system, etc.). The right hand side of FIG. 7 illustrates recipients of communications from audio control center 708 at remote communication systems 702b, 702c, 702a, and 702m. In FIG. 7, a communication from remote communication system 702a is received by speaker 718b at remote communication system 702b. A communication from remote communication system 702b is received by speaker 718c at remote communication system 702c. A communication from remote communication system 702c is received by speaker 718a at remote communication system 702a. A communication from remote communication system 702*n* is received by speaker 718*m* at remote communication system 702*m*. Of course, the recipient communication systems on the right side of FIG. 7 have been chosen arbitrarily, and are intended to illustrate that communications can flow from one remote communication system to another remote communication system through audio control center 708. Further, a user at a given remote communication system may select multiple users to hear a message (at multiple remote communication systems, as opposed to a single user as shown in FIG. 7). Further still, the user at a given remote communication system may select his or her own remote communication system as a recipient of his or her own message. Further still, software at audio control center 708 (e.g., at communication switch 712) may multiplex multiple voice inputs, as desired.

Figure 8A:
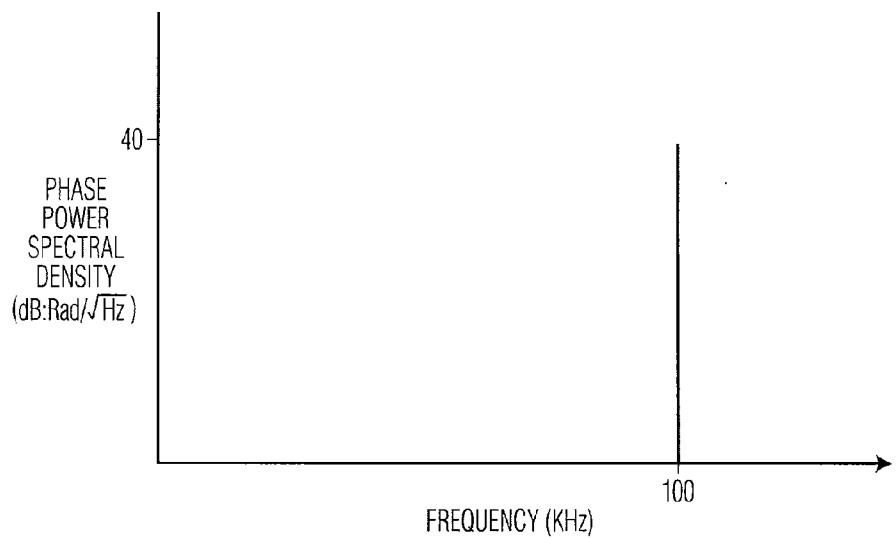
FIG. 8A is a spectral plot illustrating a spectrum of a phase carrier applied to the output of a light source in accordance with an exemplary embodiment of the present invention.
Figure 8B:
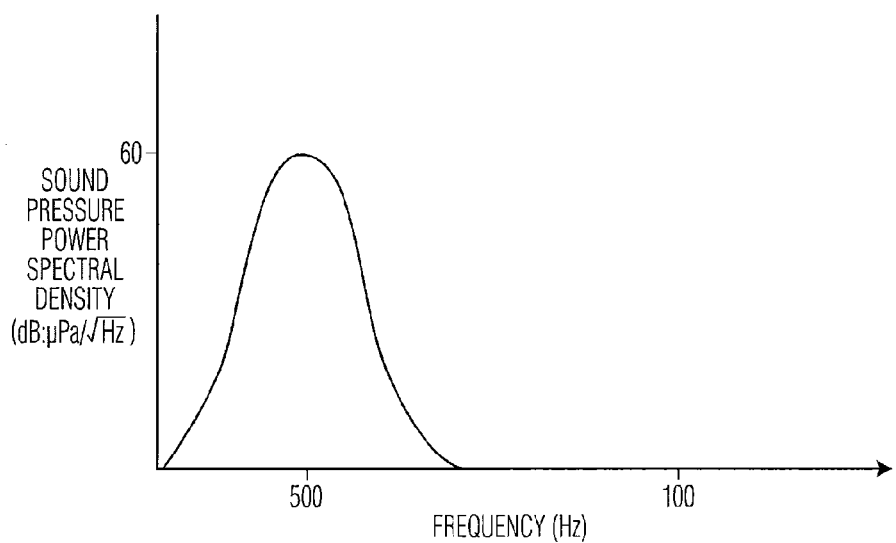
FIG. 8B is a spectral plot illustrating a spectrum of a signal introduced at a microphone in accordance with an exemplary embodiment of the present invention.
Figure 8C:
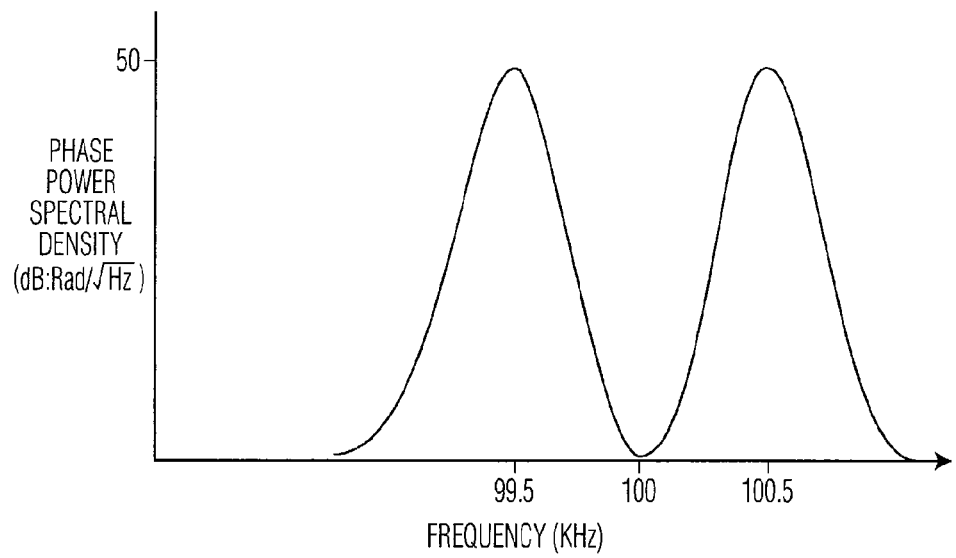
FIG. 8C is a spectral plot illustrating a modulated voice signal that is returned to a demodulator in an audio control center prior to signal demodulation in accordance with an exemplary embodiment of the present invention.
Figure 8D:
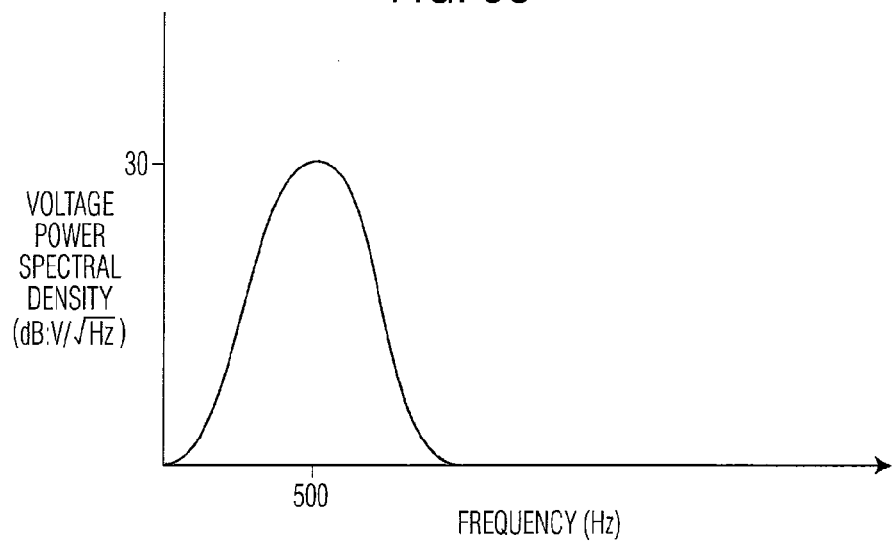
FIG. 8D is a spectral plot illustrating a spectrum of the returned signal of FIG. 8C after demodulation in accordance with an exemplary embodiment of the present invention.
Figure 8E:
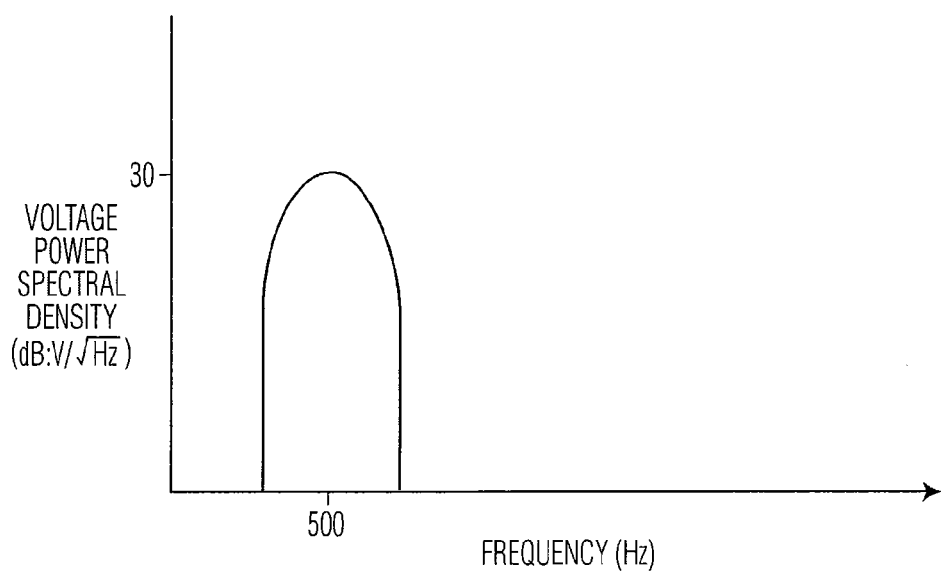
FIG. 8E is a spectral plot illustrating a spectrum of the demodulated output signal of FIG. 8D after further signal conditioning in accordance with an exemplary embodiment of the present invention.

FIGS. 8A-8E are a series of spectral plots (in the frequency domain) showing an exemplary process for detecting voice by a microphone at a remote communication system (e.g., by microphone 286*a* in FIG. 2A). It will be appreciated that the series of spectral plots is illustrative in nature, and is not intended to be accurate or prepared to any particular scale. FIG. 8A illustrates the spectrum of a phase carrier applied to the output of a light source, that is, the spectrum of a phase modulator plugged into a light source (e.g., see phase modulator 212 and light source 210 in FIG. 2A). FIG. 8B is the spectrum of a signal introduced at a microphone, more specifically, a voice vibration impinging upon a microphone (e.g., a user speaking at microphone 286*a* in FIG. 2A). FIG. 8C is the modulated voice signal (an intensity signal) that is returned to the demodulator in the audio control center prior to signal demodulation (e.g., see demodulator 218*a* in FIG. 2A). FIG. 8D is the spectrum of the returned signal after demodulation (e.g., the phase carrier has been removed by demodulator 218*a* such the modulated signal is back at baseband). FIG. 8E is the spectrum of the demodulated output signal after further conditioning (e.g., band pass filtering) such that the remaining signal approximately represents the voice seen by the microphone at the remote communication system (e.g., see controller 220 in FIG. 2A which provides signal conditioning). After conditioning the signal is prepared for storage (e.g., in data storage 222 in FIG. 2A) and retransmission (e.g., to one or more remote communication systems, as selected by the user via a remote communications channel selector).

Figure 9:
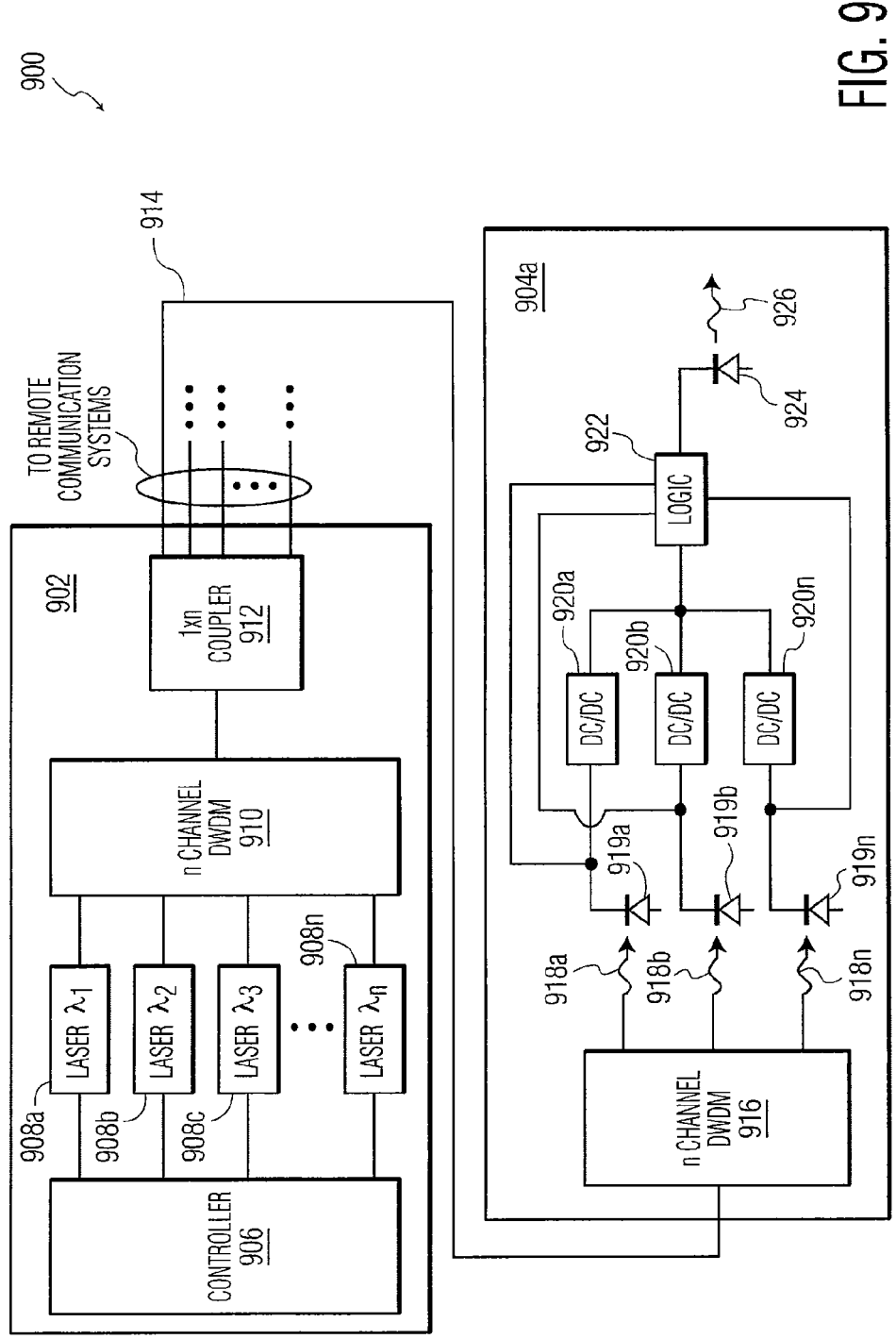
FIG. 9 is a block diagram illustrating elements of yet another light powered communication system in accordance with an exemplary embodiment of the present invention.

As will be appreciated by those skilled in the art, it is desirable to provide a user at a given remote communication system (e.g., system 204*a* in FIG. 2A) with some type of an indication of an incoming communication/call. FIG. 9 illustrates an exemplary system 900 for providing an optically powered indication of an incoming call (e.g., an optically powered remote ringer at a remote communication system). Based upon information received from a remote communications channel selector (e.g., see FIGS. 4-6), a controller 906 in an audio control center 902 commands lasers 908*a*, 908*b*, 908*c*, ..., 908*n* (e.g., distributed feedback lasers) to operate, each at a different wavelength $\lambda_1, \lambda_2, \lambda_3, \ldots, \lambda_n$. A DWDM 910 combines the different wavelength signals into a single DC signal that may be split at an optical coupler 912 to travel along a path 914 to all (or selected) remote communication systems 904*a*, etc. (only a single remote control system 904*a* is shown in FIG. 9 for simplicity). Each remote communication system receives an identical code, commanding a single or particular set of remote users to be notified of an incoming transmission.

At each remote communication system, DWDM 916 divides the light into different wavelength signals 918*a*, 918*b*, ..., 918*n*, each transmitted along a separate fiber to a respective photodetector 919*a*, 919*b*, ..., 919*n*. Photodetectors 919*a*, 919*b*, ..., 919*n* convert the received light into respective electrical current signals. Each of the electrical signals is split into two signal portions. The first signal portions provide a bias voltage for logic circuitry 922 through respective DC/DC converters 920*a*, 920*b*, ..., 920*n*. The second signal portions are the inputs (e.g., binary coded inputs) to logic circuitry 922. If the wavelength code (and hence, binary word value) corresponds to the binary address of a given remote communication system (as determined by logic circuitry 922), an output of logic circuitry 922 provides voltage to a drive LED 924 to provide a light signal 926 in the visible part of the spectrum. Thus, a visual signal of an incoming call is provided to the user at a remote communication system. Various types of annunciation are contemplated such as illumination, a buzzer, a ringer, etc. (e.g., annunciators 103*a*, 103*b*, 103*c*, ..., 103*n* in FIG. 1).

Thus, according to the various exemplary embodiments of the present invention described herein, bi-directional light powered communication systems are provided. As the communications from an audio control center are optically driven, and because all communications between locations of the light powered communication system are through the audio control center, electricity is not required at each of the plurality of remote communication systems. Thus, a simplified, cost effective communication system is provided while overcoming certain of the deficiencies of conventional communication systems.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A light powered communication system comprising:
   an audio control center including at least one optical source and at least one optical receiver;
   a plurality of optically powered remote communication systems located remote from the audio control center, each of the optically powered remote communication systems being configured to receive an optical signal from the audio control center;
   at least one length of fiber optic cable between the audio control center and each of the optically powered remote communication systems; and
   a plurality of channel selectors, wherein a user of a first of the optically powered remote communication systems uses at least one of the channel selectors to direct communications from the first of the optically powered remote communication systems to at least one other of the optically powered remote communication systems.

2. The light powered communication system of claim 1 wherein each of the optically powered remote communication systems includes an optically powered headset.

3. The light powered communication system of claim 2 wherein the optically powered headset includes an earpiece and a microphone.

4. The light powered communication system of claim 1 wherein each of the optically powered remote communication systems includes a microphone.

5. The light powered communication system of claim 4 wherein the microphone includes a coil of fiber configured to receive audio signals.

6. The light powered communication system of claim 5 wherein the coil of fiber is a portion of a Michelson interferometer.

7. The light powered communication system of claim 4 wherein the microphone is a portion of a linearized Sagnac interferometer.

8. The light powered communication system of claim 1 wherein each of the optically powered remote communication systems is configured to transmit an optical signal to the audio control center.

9. The light powered communication system of claim 1 wherein bidirectional communications between the audio control center and plurality of optically powered remote communication systems are optically powered signals.

10. The light powered communication system of claim 1 wherein the audio control center includes at least one interrogator for interrogating the plurality of channel selectors.

11. The light powered communication system of claim 1 wherein communications between ones of the optically powered remote communication systems is through the audio control center.

12. A light powered communication system comprising:
an audio control center including at least one optical source and at least one optical receiver;
a plurality of optically powered remote communication systems located remote from the audio control center, each of the optically powered remote communication systems being configured to receive an optical signal from the audio control center; and
at least one length of fiber optic cable between the audio control center and each of the optically powered remote communication systems,
wherein each of the optically powered remote communication systems includes an annunciator for providing an indication of an incoming communication from the audio control center.

13. The light powered communication system of claim 12 wherein the annunciator is driven by an optical signal initiated at the audio control center.

14. A method of operating a light powered communication system comprising the steps of:
(a) receiving an audio signal at one of a plurality of remote communication systems of the optically powered communication system;
(b) transmitting an optical signal representative of the audio signal from the one of the plurality of remote communication systems to an audio control center of the optically powered communication system;
(c) transmitting another optical signal representative of the audio signal to at least one other of the plurality of remote communication systems;

(d) converting the another optical signal to an audio output at the at least one other of the plurality of remote communication systems; and
(e) operating a channel selector at the one of the remote communication systems in order to select others of the remote communication systems to receive communications from the one of the remote communication systems via the audio control center.

15. The method of claim 14 wherein step (a) includes receiving the audio signal at an optically powered headset included at the one of a plurality of remote communication systems.

16. The method of claim 14 wherein step (a) includes receiving the audio signal at a microphone included at the one of a plurality of remote communication systems.

17. The method of claim 16 wherein the microphone includes a coil of fiber configured to receive audio signals.

18. The method of claim 17 wherein the coil of fiber is a portion of a Michelson interferometer.

19. The method of claim 16 wherein the microphone is a portion of a linearized Sagnac interferometer.

20. The method of claim 14 further comprising the step of:
(f) interrogating the channel selector at the one of the remote communication systems using an interrogator at the audio control center.

21. A method of operating a light powered communication system comprising the steps of:
(a) receiving an audio signal at one of a plurality of remote communication systems of the optically powered communication system;
(b) transmitting an optical signal representative of the audio signal from the one of the plurality of remote communication systems to an audio control center of the optically powered communication system;
(c) transmitting another optical signal representative of the audio signal to at least one other of the plurality of remote communication systems; and
(d) converting the another optical signal to an audio output at the at least one other of the plurality of remote communication systems; and
(e) providing an indication of an incoming communication from the audio control center at another of the remote communication systems, the indication being driven by a light source at the audio control center.

* * * * *